(12) United States Patent
Kim et al.

(10) Patent No.: US 10,630,538 B2
(45) Date of Patent: Apr. 21, 2020

(54) SOFTWARE UPDATE METHOD AND APPARATUS FOR VEHICLE

(71) Applicants: HYUNDAI MOTOR COMPANY, Seoul (KR); KIA MOTORS CORPORATION, Seoul (KR)

(72) Inventors: Dong Ok Kim, Goyang-si (KR); Jun Byung Chae, Seoul (KR); Kang Woon Seo, Seoul (KR); Jin Hwa Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/727,300

(22) Filed: Oct. 6, 2017

(65) Prior Publication Data
US 2018/0102939 A1    Apr. 12, 2018

(30) Foreign Application Priority Data

Oct. 7, 2016  (KR) .................. 10-2016-0130001
Sep. 25, 2017  (KR) .................. 10-2017-0123231

(51) Int. Cl.
| | |
|---|---|
| *G06F 15/173* | (2006.01) |
| *H04L 12/24* | (2006.01) |
| *H04L 29/08* | (2006.01) |
| *H04L 12/40* | (2006.01) |
| *G06F 8/65* | (2018.01) |

(Continued)

(52) U.S. Cl.
CPC ............. *H04L 41/08* (2013.01); *G06F 8/65* (2013.01); *G06F 11/004* (2013.01); *H04L 12/40169* (2013.01); *H04L 41/082* (2013.01); *H04L 67/125* (2013.01); *H04L 67/32* (2013.01); *H04L 67/34* (2013.01); *H04L 67/12* (2013.01); *H04L 2012/40273* (2013.01); *H04W 52/0248* (2013.01); *Y02D 10/42* (2018.01)

(58) Field of Classification Search
CPC . H04L 41/08; H04L 12/40169; H04L 41/082; H04L 67/125; H04L 67/32; H04L 67/34; G06F 8/65; G06F 11/004
USPC .......................................................... 709/225
See application file for complete search history.

(56) References Cited

U.S. PATENT DOCUMENTS

2003/0206564 A1* 11/2003 Mills ........................ H04L 12/12
                                                        370/528
2005/0228856 A1* 10/2005 Swildens ................... G06F 9/50
                                                        709/200

(Continued)

*Primary Examiner* — Thanh T Nguyen
(74) *Attorney, Agent, or Firm* — Morgan, Lewis & Bockius LLP

(57) ABSTRACT

An operation method of a first communication node constituting an Ethernet-based vehicle network of a vehicle may comprise waking up by transitioning from a sleep state to a ready state; preventing transmission of network requests to other communication nodes connected to the Ethernet-based vehicle network; and performing update of software. Thus, only a target end node among a plurality of end nodes connected to the Ethernet-based vehicle network can be woken up for update of software so as to reduce power consumption of the vehicle due to the update of software. Also, abnormal operations due to the update of software can be prevented by allowing the update of software to be performed only while the vehicle is not running.

17 Claims, 4 Drawing Sheets

(51) Int. Cl.
*G06F 11/00* (2006.01)
*H04W 52/02* (2009.01)

(56) References Cited

U.S. PATENT DOCUMENTS

| | | | |
|---|---|---|---|
| 2010/0050168 A1* | 2/2010 | Sharonov | E21B 47/12 717/173 |
| 2015/0169311 A1* | 6/2015 | Dickerson | G06F 8/65 717/170 |

* cited by examiner

SOFTWARE UPDATE METHOD AND APPARATUS FOR VEHICLE

CROSS-REFERENCE TO RELATED APPLICATIONS

This application is based on and claims the benefit of priority to Korean Patent Applications No. 10-2016-0130001 filed on Oct. 7, 2016 and 10-2017-0123231 filed on Sep. 25, 2017 with the Korean Intellectual Property Office (KIPO), the entirety of which is incorporated by reference as if fully set forth herein.

TECHNICAL FIELD

The present disclosure relates to a method and an apparatus for updating software of a vehicle, and more specifically, to a method and an apparatus for updating software of a vehicle, which can reduce power consumption and prevent update malfunctions when the software is updated.

BACKGROUND

Electronic devices installed in a vehicle have been increased significantly in their number and variety along with recent digitalization of vehicle parts. Generally, electronic devices may be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

Meanwhile, the telematics system and the infotainment system, like most enhanced safety systems of a vehicle do, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

There has been an increasing demand for software updates of deployed control devices of vehicles, and various methods for the software updates of control devices have been proposed. Among the software update methods, a scheduled update method may update software of a control device by setting a specific reservation time (for example, a time when the vehicle is not running or the vehicle's ignition is turned off).

In the scheduled update method according to the prior art, a communicator (e.g., a telematics unit or a multimedia head unit) disposed in a vehicle may be woken up at the specific reservation time, and the communicator may download software to be updated from the software center. Thereafter, the downloaded software can be used by each control device in order to update software of each control device.

Such the conventional software update method has a problem that a large amount of electric power is consumed because electronic control units (ECUs) of control devices woken up for the scheduled update operate. That is, there is a problem that power consumption is increased because not only a control device for which software is updated but also other control devices are woken up.

SUMMARY

The present disclosure provides a method and an apparatus for updating software of a vehicle, which can reduce power consumption when the software is updated on a scheduled update basis.

The present disclosure also provides a method and an apparatus for updating software of a vehicle, which can prevent update malfunctions when the software is updated on a scheduled update basis.

In accordance with embodiments of the present disclosure, an operation method of a first communication node constituting an Ethernet-based vehicle network of a vehicle may comprise waking up by transitioning from a sleep state to a ready state; preventing transmission of network requests to other communication nodes connected to the Ethernet-based vehicle network; and performing update of software.

The transitioning from the sleep state to the ready state may be performed at an update reservation time when software of the first communication node is updated.

The update of software may be performed in a case that the software used for the update is identified as being stored in a memory of the first communication node.

The update reservation time may be received from a second communication node connected to the Ethernet-based vehicle network.

The update of software may be performed while the vehicle is turned off.

A result of the update of software may be transmitted to the second communication node after the vehicle is turned on.

The operation method may further comprise performing a reboot and checking the update of software after the update of software is completed.

The operation method may further comprise restoring previous software before the update when the update of software fails.

Further, in accordance with embodiments of the present disclosure, an operation method of a communicator constituting an Ethernet-based vehicle network of a vehicle may comprise waking up at an update reservation time by transitioning from a sleep state to a ready state; and preventing transmission of network requests to communication nodes connected to the Ethernet-based vehicle network.

The operation method may further comprise downloading software from a software center.

The operation method may further comprise performing update of software of the communicator using the downloaded software.

The software may be downloaded after the waking up at the update reservation time.

The software may be downloaded while the vehicle is running.

The operation method may further comprise transmitting the downloaded software to a specific communication node connected to the Ethernet-based vehicle network when the downloaded software corresponds to the specific communication node.

The operation method may further comprise receiving a result of updating software of the specific communication node using the downloaded software from the specific communication node.

Further, in accordance with embodiments of the present disclosure, a communication node constituting an Ethernet-based vehicle network of a vehicle may comprise a physical (PHY) layer including a PHY layer processor, and a controller including a controller processor and a memory storing at least one instruction executed by at least one of the PHY layer processor and the controller processor. Also, the at least one instruction may be configured to wake up at an update reservation time by transitioning from a sleep state to a ready state; and prevent transmission of network requests to other communication nodes connected to the Ethernet-based vehicle network.

The at least one instruction may be further configured to receive software from a communicator in the vehicle while the vehicle is running; store the received software in the memory; receive an update reservation time of the received software from the communicator; and update software of the communication node using the received software at the update reservation time.

The at least one instruction may be further configured to update the software of the communication node after the vehicle is turned off.

The at least one instruction may be further configured to perform a reboot and check the updating of the software after the updating of the software is completed.

The at least one instruction may be further configured to restore previous software before the updating when the updating of the software fails.

Using methods and apparatuses for updating software of a vehicle according to the embodiments of the present disclosure, only a target end node among a plurality of end nodes connected to an Ethernet-based vehicle network can be woken up for update of software so as to reduce power consumption of the vehicle due to the update of software. Also, abnormal operations due to the update of software can be prevented by allowing the update of software to be performed only while the vehicle is not running.

Also, a communicator may receive a software update result from a target end node, and a communicator may retry the update of software based on the software update result.

BRIEF DESCRIPTION OF DRAWINGS

Embodiments of the present disclosure will become more apparent by describing in detail forms of the present disclosure with reference to the accompanying drawings, in which.

Figure 1:
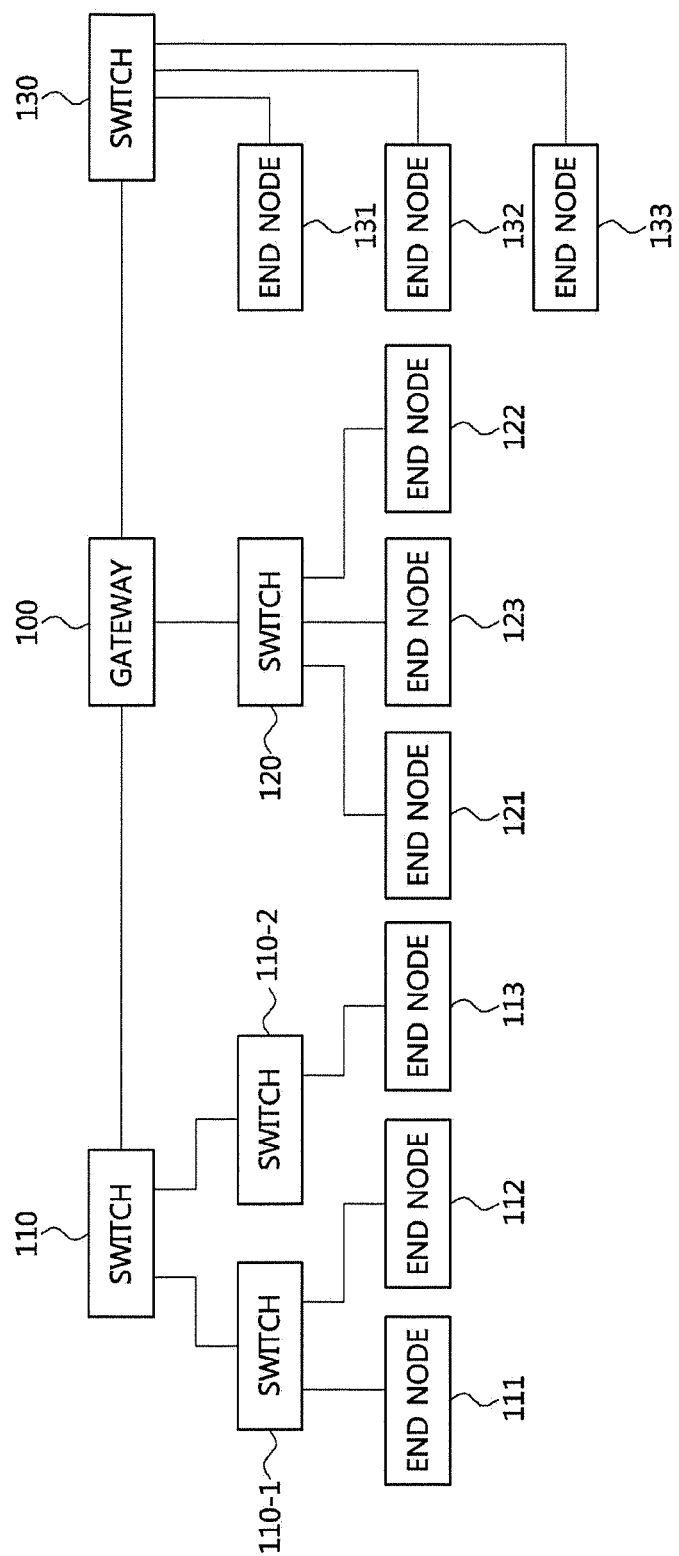
FIG. 1 is a block diagram illustrating a first embodiment of a vehicle network topology.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a first embodiment of a vehicle network topology.

Referring to FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

Meanwhile, the communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. A communication node belonging to the vehicle network may be configured as follows.

Figure 2:
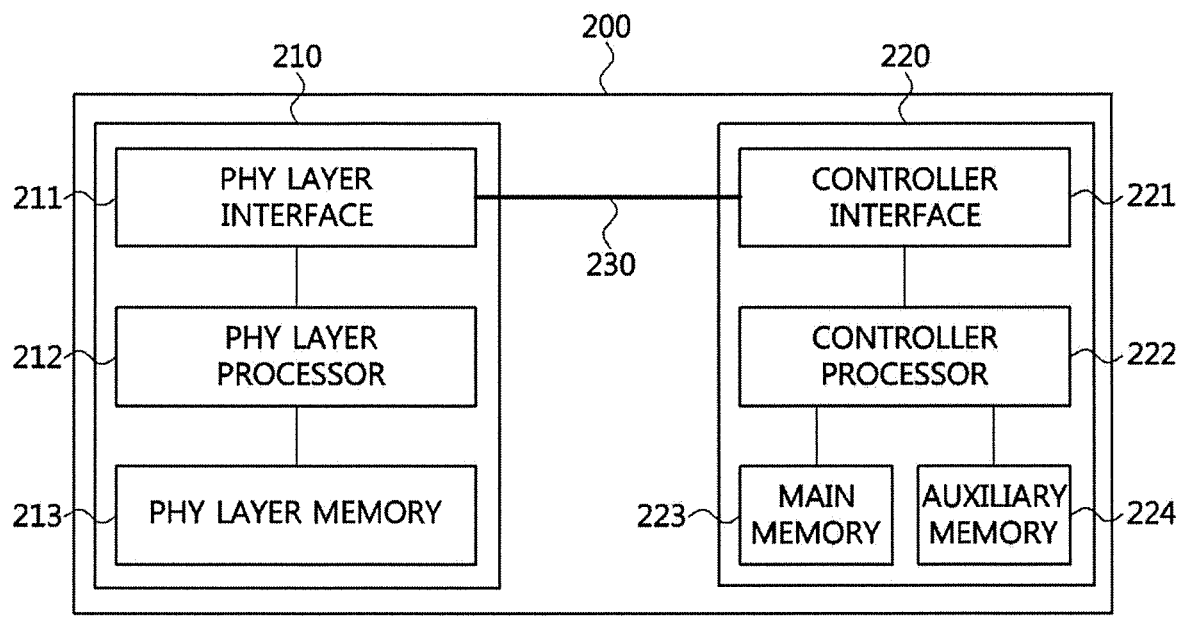
FIG. 2 is a block diagram illustrating a first embodiment of a communication node belonging to a vehicle network.

FIG. 2 is a block diagram illustrating a first embodiment of a communication node belonging to a vehicle network.

Referring to FIG. 2, a communication node 200 constituting a vehicle network may include a physical (PHY) layer 210 and a controller 220. Also, the communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like). The PHY layer 210 and the controller 220 may be implemented as one system on chip (SoC), or alternatively may be implemented as separate chips.

The PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer 210 may include a PHY layer interface 211, a PHY layer processor 212, and a PHY layer memory 213. The PHY layer processor 212 is an electric circuitry which performs various functions described below. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MIT 230. The controller 220 may include a controller interface 221, a controller processor 222, a main memory 223, and an auxiliary memory 224. The controller processor 222 is an electric circuitry which performs various functions described below. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

In the following description, a method performed at a communication node belonging to a vehicle network and a corresponding counterpart communication node will be described. Hereinafter, even when a method (e.g., transmission or reception of a signal) to be performed at a first communication node is described, a counterpart second communication node corresponding to the first communication node may perform a method (e.g., reception or transmission of the signal) corresponding to the method performed at the first communication node. That is, when the operation of the first communication node is described, the corresponding second communication node can perform a counterpart operation corresponding to the operation of the first communication node. Conversely, when the operation of the second communication node is described, the corresponding first communication node can perform a counterpart operation corresponding to the operation of the second communication node.

Figure 3:
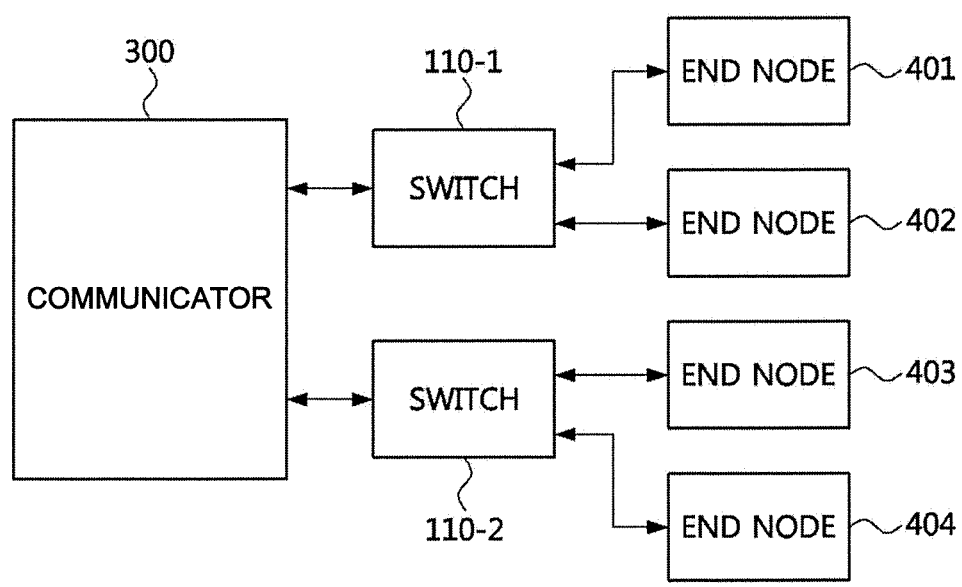
FIG. 3 is a conceptual diagram illustrating a software update apparatus for a vehicle according to an embodiment of the present disclosure.

FIG. 3 is a conceptual diagram illustrating a software update apparatus for a vehicle according to an embodiment of the present disclosure.

Referring to FIG. 3, a software update apparatus for a vehicle according to an embodiment of the present disclosure may include a communicator 300 disposed in a vehicle, a plurality of switches 110-1 and 110-2, and a plurality of end nodes 401 to 404. Here, each of the plurality of end nodes 401 to 404 may be a vehicle control device (e.g., a brake control device, a suspension control device, a speed control device, or the like). Although FIG. 3 shows only four end nodes 401 to 404, embodiments of the present disclosure are not limited thereto. The number of end nodes may be changed according to the number of control devices disposed in the vehicle.

The communicator 300, a hardware device implemented with various electronic circuits to transmit and receive signals via wireless or landline connections, may be a telematics or multimedia head unit, and may include a communication modulator and demodulator (modem) for connection with external communication devices and a display module for displaying information to a user.

The communicator 300 may download software for at least one of the end nodes 401 to 404 disposed in the vehicle from a software center (not shown in FIG. 5) using the communication modem. Here, the communicator 300 may download the software for at least one of the communicator 300 and the end nodes 401 to 404 from the software center while the vehicle is running. Also, the software center 500 may be any server or a similar entity existing for distributing software of the control devices for the vehicle, which is securely managed by a vehicle manufacturer, a control device manufacture, or the like.

The communicator 300 may determine whether the downloaded software corresponding to the communicator 300 or whether the downloaded software corresponds to which end node among the plurality of end nodes disposed in the vehicle. When the downloaded software corresponds to a specific end node (e.g., the end node 401 which is referred to as 'target end node')) among the plurality of end nodes, the communicator 300 may transmit the downloaded software to the target end node 401 that requires update of the software based on the determination result. At this time, the communicator 300 may transmit the downloaded software for updating to the target end node 401 even while the vehicle is running.

Further, the communicator 300 may set an update reservation time. Here, the communicator 300 may maintain the update reservation time previously set, or may set a new update reservation time by receiving a newly-inputted update reservation time from the user. For this, the communicator 300 may display a menu for maintaining or changing the update reservation time on a display screen, and may receive information on maintenance or change of the update reservation time from the user. Then, the communicator 300 may store the set update reservation time, and transmit the set update reservation time to the target end node 401. Here, the update reservation time may be applied to the update of the software for the communicator 300 and the end nodes 401 to 404.

Here, the PHY layer of the communicator 300 may be in a normal state while the vehicle is running, and the PHY layer of the communicator 300 may transition to a sleep state when the vehicle is turned off. The PHY layer may transition to a ready state when the update reservation time comes, and may transition to a sleep state when the update of software is completed.

When the software of the communicator 300 is downloaded from the software center, the software may be stored in the memory of the communicator 300. Then, at the update reservation time, the communicator 300 may be woken up and perform an update operation for its software. The update operation for the software may be performed while the vehicle is not running after the vehicle is turned off. When the software of the communicator 300 is updated, the PHY layer of the communicator 300 may wake up and control a physical coding sub-layer (PCS) of the PHY layer so that network requests are not transmitted to the end nodes 401 to 404. That is, the communicator 300 can prevent transmission of the network requests to the end nodes 401 to 404.

As another embodiment of the present disclosure, the communicator 300 may download software of the communicator 300 or the end nodes 401 to 404 from the software center even while the vehicle is not running. In this case, the communicator 300 may wake up at the update reservation time and download the software of the communicator 300 or the end nodes 401 to 404 from the software center in a state where the vehicle is not turned on. When the software of the communicator 300 is downloaded, the communicator 300 may perform the update of the software and prevent transmission of the network requests to the end nodes 401 to 404.

Referring to FIG. 2, each of the communicator 300 and the plurality of end nodes 401 to 404 may be connected to an Ethernet-based vehicle network, and may update its software at the update reservation time. In the Ethernet-based vehicle network, the communicator 300 may be a first communication node, and each of the plurality of end nodes 401 to 404 may be a second communication node. On the other hand, each of the plurality of end nodes 401 to 404 may be a first communication node, and the communicator 300 may be a second communication node.

Each of the communicator 300 and the plurality of end nodes 401 to 404 may include a PHY layer (e.g., the PHY layer 210 in FIG. 2) including a PHY layer processor (e.g., the PHY layer processor 212 in FIG. 2), a controller (e.g., the controller 220 in FIG. 2) including a controller processor (e.g., the controller processor 222 in FIG. 2), and a memory storing at least one instruction to be executed by at least one of the PHY layer processor and controller layer processor.

Here, each of the communicator 300 and the plurality of end nodes 401 to 404 may perform the following operation through the at least one instruction stored in the memory. Each of the plurality of end nodes 401 to 404 may receive the downloaded software from the communicator 300 disposed in the vehicle during running of the vehicle. Also, each of the plurality of end nodes 401 to 404 may store the received software in the memory while the vehicle is running. Further, each of the plurality of end nodes 401 to 404 may receive the set update reservation time from the communicator 300 of the vehicle. Then, each of the plurality of end nodes 401 to 404 may perform an update of its software using the received software stored in the memory at the update reservation time of the software while the vehicle is not running.

Hereinafter, among the plurality of end nodes 401 to 404, an end node whose software is to be updated may be defined as a target end node. Thus, the target end node 401 receiving the software from the communicator 300 among the plurality of end nodes 401 to 404 may store the received software in its memory. The target end node 401 may perform the operation of receiving and storing the software while the vehicle is running.

Here, if the software of the target end node 401 is updated during the running of the vehicle, the target end node 401 may not normally operate during the software update. Therefore, in order to prevent abnormal operations of the target end node 401 from being caused by the software update, the target end node 401 may not immediately perform the update of the software, but store the received software in the memory so that the software can be updated at the preset update reservation time.

The target end node 401 may determine whether the vehicle is not running (or, the vehicle is turned off), and perform the updating of its software using the stored software in the memory at the update reservation time in the state that the vehicle is not running (or, the vehicle is turned off). Here, the target end node 401 may wake up at the update reservation time, and supply power to the PHY layer of the target end node 401. Then, the target end node 401 may transmit a request of link-up and a request of wake-up to the communicator 300.

The target end node 401 may perform a reboot after the update of software has been performed, and check whether the software update has been normally performed.

The target end node 401 may restore the previous software if an error occurs in the update of the software. On the other hand, the target end node 401 may complete the update when the update of software is determined as have been normally performed. At this time, the target end node 401 may transmit the update result to the communicator 300.

Here, the communicator 300 may not download the same version of software from the software center 500 when the update of the software in the target end node 401 was successful, based on the update result received from the target end node 401. On the other hand, the communicator 300 may download the same version of the software again from the software center 500 when the update of the software in the target end node 401 failed.

In the present disclosure, when the software is updated, the target end node 410 may request the communicator 300 to prevent transmission of network requests so that other end nodes 402 to 404 except the target end node 401 are not woken up.

Here, the target end node 401 may request the prevention of transmission of network requests to the communicator 300 at one or both of the following two time points.

First, the target end node 401 may supply power to the PHY layer when waking up at the update reservation time, and control a PCS of the PHY layer so that network requests (e.g., network management (NM) messages) are not transmitted to the communicator 300 or other end nodes 402 to 404. As another example, the target end node 401 may supply power to the PHY layer when waking up at the update reservation time, and request the communicator 300 to prevent transmission of network requests. That is, the target end node 401 may prevent transmission of network requests to the communicator 300 or the other end nodes 402 to 404.

Second, the target end node 401 may perform a reboot to check whether the update of software has been normally performed after performing the update operation. After the target end node 401 is rebooted, the target end node 401 may supply power to the PHY layer and control the PCS of the PHY layer so that network requests are not transmitted to the communicator 300 or other end nodes 402 to 404. As another example, after the target end node 401 is rebooted, the target end node 401 may supply power to the PHY layer and request the communicator 300 to prevent transmission of network requests.

Upon receiving the request of prevention of the transmission of network requests from the target end node 401, the communicator 300 may control a physical coding sub-layer (PCS) in its PHY layer not to transmit network requests to the other end nodes 402 to 404. On the other hand, as another example, when the communicator 300 receives the request of prevention from the target end node 401, the communicator 300 may control PCSs of respective end nodes 402 to 404 so that the network requests are not forwarded to upper layers of the other end nodes 402 to 404.

Thus, during the update of software, the other end nodes 402 to 404 except the target end node 401 may be prevented from being woken up. That is, at the time of software update of the target end node 401, the power consumption of the vehicle in which the other end nodes 402 to 404 are woken up may increase. In order to prevent this, the communicator 300 may wake up only the target end node 401.

Figure 4:
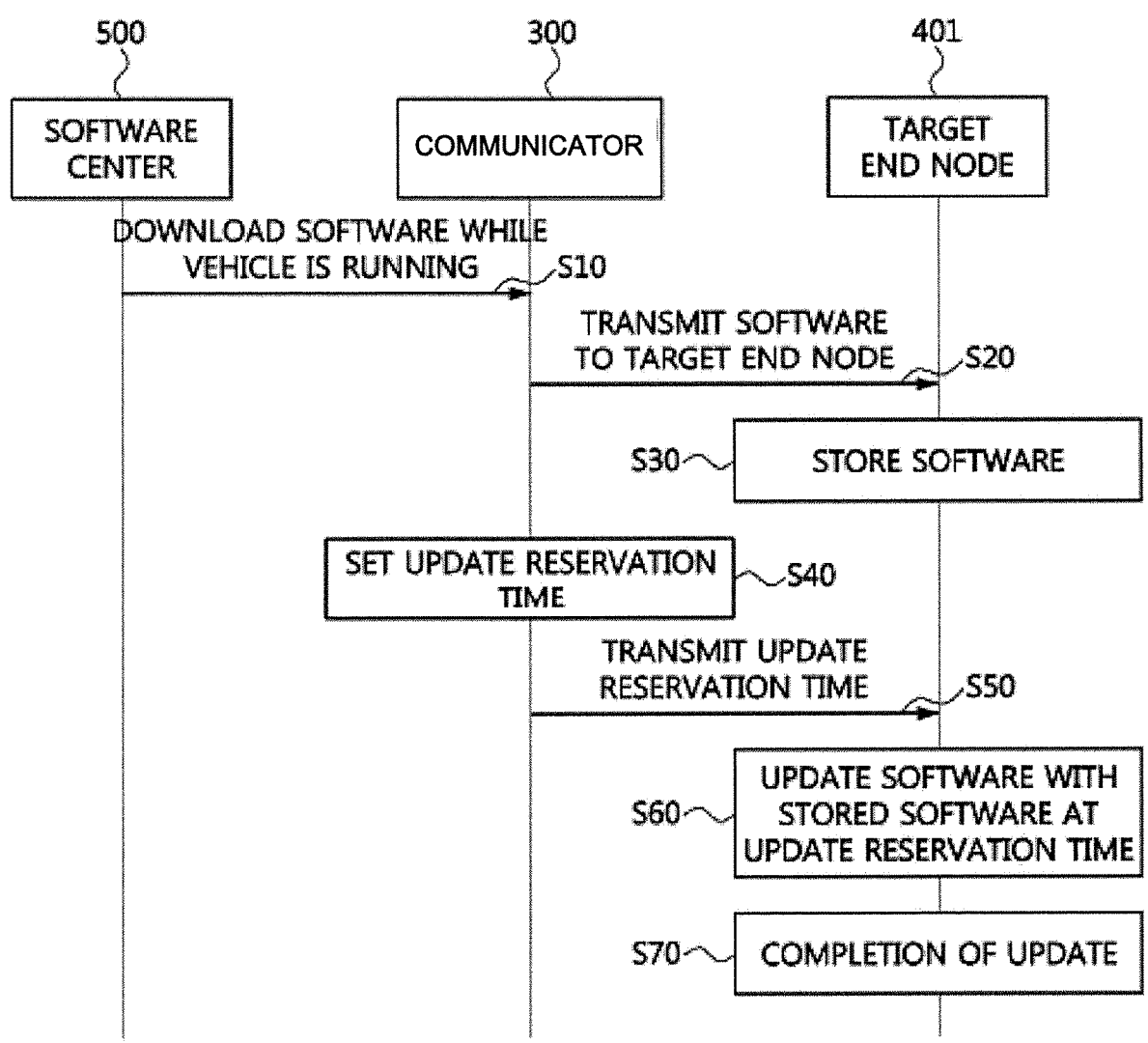
FIG. 4 is a sequence chart for explaining a software update method for a vehicle according to an embodiment of the present disclosure.

FIG. 4 is a sequence chart for explaining a software update method for a vehicle according to an embodiment of the present disclosure.

Referring to FIG. 4, the communicator 300 disposed in the vehicle may download software from the software center 500 using the communication modem (S10). Here, a telematics or multimedia head unit may be applied as the communicator 300, and downloading of the software may be performed even while the vehicle is running.

Then, the communicator 300 may determine which of the plurality of end nodes disposed in the vehicle corresponds to the downloaded software. Then, the communicator 300 may transmit the downloaded software to the target end node 401 that requires updating of the software based on the determination result (S20). The PHY layer of the target end node 401 may be in a normal state while the vehicle is running, and the target end node 401 may receive the software from the communicator 300.

Subsequently, the target end node 401 receiving the software from the communicator 300 may store the received software in a memory (S30). Here, the target end node 401 may store the software in the memory so that the software update can be performed at a scheduled time (i.e., update reservation time) without directly performing the software update.

Then, the communicator 300 may set an update reservation time. Here, the communicator 300 may maintain the update reservation time previously set, or may set a new update reservation time by receiving a newly-inputted update reservation time from the user.

Then, the communicator 300 may transmit information on the set update reservation time to the target end node 401 (S40). This allows the target end node 401 to be woken up at the scheduled update reservation time. When the vehicle is turned off after the running of the vehicle, the target end node 401 may switch the PHY layer from a normal state to a sleep state.

Here, the target end node 401 in the sleep state may switch the PHY layer from the sleep state to the ready state when the update reservation time comes. The target end node 401 may wake up at the update reservation time, and supply power to the PHY layer of the target end node 401. Also, the target end node 401 may transmit a request of link-up and a request of wake-up to the communicator 300.

Here, the target end node 410 may control the PCS of the PHY layer not to transmit network requests to the communicator 300 or the other end nodes 402 to 404 so that the other end nodes 402 to 404 are not woken up.

As another example, the target end node 401 may request the communicator 300 to prevent transmission of network requests. Upon receiving the request from the target end node 401, the communicator 300 may control a PCS in its PHY layer not to transmit network requests to the other end nodes 402 to 404. Thus, during update of the software, other end nodes 402 to 404 except the target end node 401 may be prevented from being woken up.

Wake-up of the target end node 401 may be performed in a state in which the vehicle is not turned on, that is, in a state in which the vehicle is not running. If the vehicle is running (or, turned on) even at the update reservation time, the update of the software of the target end node 401 may not be performed.

Then, the target end node 401 may perform update of its software stored with the software stored in the memory (S60). At this time, updating of the software at the target end node 401 may be performed in the state in which the vehicle is not turned on and the vehicle is not running.

Then, the target end node 401 may complete the update of software in the case that the software update is determined as normally performed (S70). On the other hand, the target end node 401 may recover the previous software if an error occurs in the updating of the software. At this time, the target end node 401 may transmit the update result to the communicator 300.

Meanwhile, in the description of S50, it was described that the target end node 401 may request the communicator 300 to prevent transmissions of network requests. However, embodiments of the present disclosure are not limited thereto. As another example, after performing the update operation, the target end node 401 may perform a reboot in order to check whether the software update is normally performed. The target end node 401 may supply power to the PHY layer after rebooting and may request the communicator 300 to prevent transmissions of network requests. The PHY layer of the target end node 401 may maintain the ready state until the update of the software is completed. The target end node 401 may switch the PHY layer from the ready state to the sleep state after the update of the software is completed.

Figure 5:
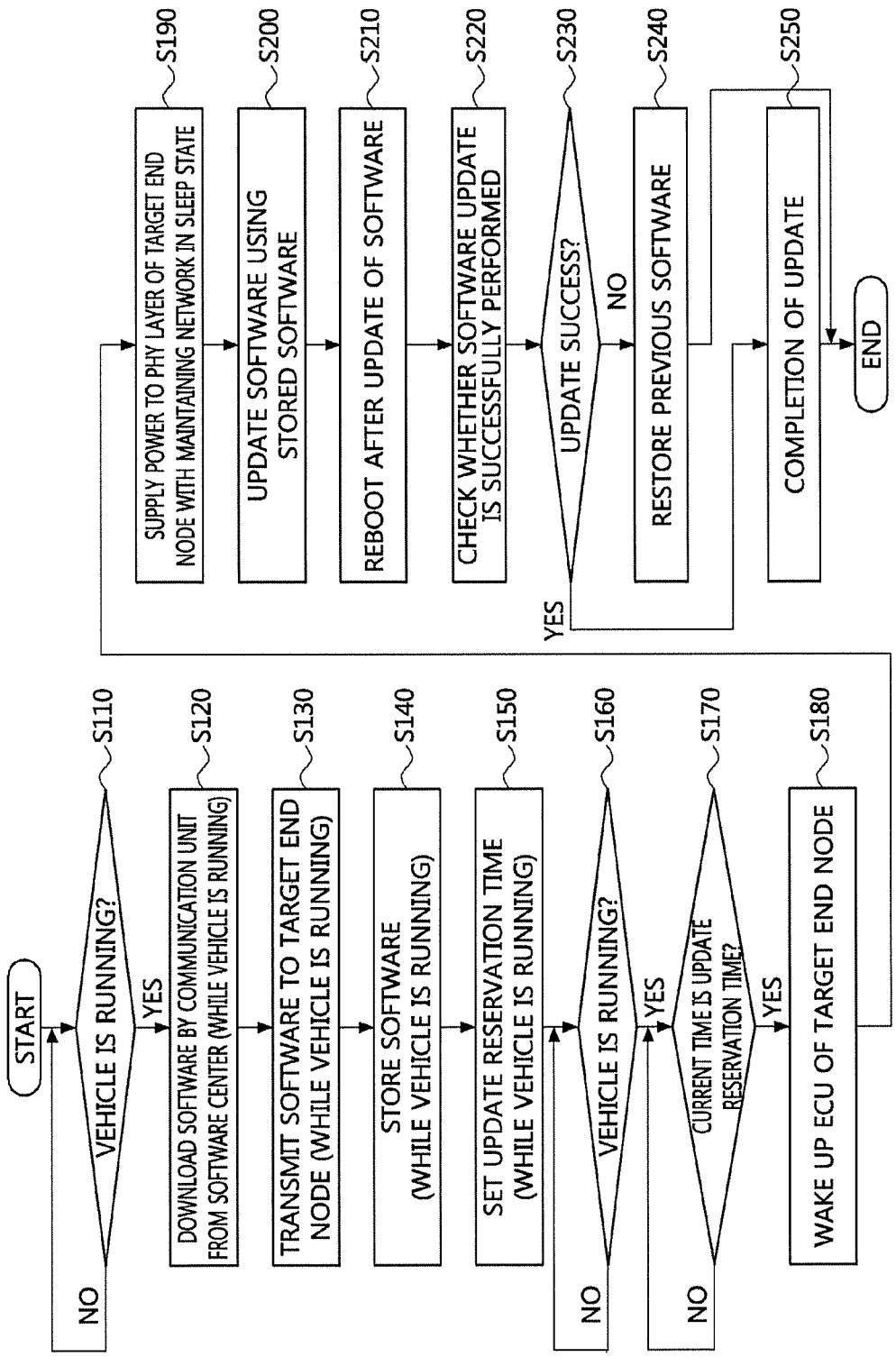
FIG. 5 is a sequence chart for explaining operations between a communicator and a target end node as an embodiment of a software update method according to the present disclosure.

FIG. 5 is a sequence chart for explaining operations between a communication node and a target end node as an embodiment of a software update method according to the present disclosure.

Referring to FIG. 5, the communicator 300 disposed in the vehicle may determine whether the vehicle is running (S110).

As a result of the determination in S110, while the vehicle is running, the communicator 300 may download software for at least one of the end nodes disposed in the vehicle from the software center 500 using the communication modem (S120). On the other hand, if it is determined in the step S110 that the vehicle is not running, the communicator 300 may return to the step S110 to determine again whether the vehicle is running.

Here, a telematics or multimedia head unit may be applied as the communicator 300, and downloading of the software may be performed while the vehicle is running. Also, each of the plurality of end nodes 401 to 404 may be a vehicle control device (e.g., a brake control device, a suspension control device, a speed control device, and the like).

Then, the communicator 300 may determine whether the downloaded software corresponds to which end node among the plurality of end nodes disposed in the vehicle. Also, the communicator 300 may transmit the downloaded software to a target end node 401 that requires updating of the software based on the determination result (S130). At this time, the communicator 300 may transmit the downloaded software for updating to the target end node 401 while the vehicle is running. The PHY layer of the target end node 401 may be in a normal state while the vehicle is running and the target end node 401 may receive the software from the communicator 300.

The target end node 401 receiving the software from the communicator 300 among the plurality of end nodes 401 to 404 may store the received software in its memory (S140). Here, if the software of the target end node 401 is updated during the running of the vehicle, the target end node 401 may not normally operate during the software update. Therefore, in order to prevent abnormal operations of the target end node 401 from being caused by the software update, the target end node 401 may not immediately perform the update of the software, but store the received software in the memory so that the software can be updated at the preset update reservation time. The target end node 410 may perform the update of the software at the update reservation time if the vehicle is not running, but may not perform the update of the software even at the update reservation time if the vehicle is running.

Then, the communicator 300 may set an update reservation time (S150). Here, the communicator 300 may maintain the update reservation time previously set, or may set a new update reservation time by receiving a newly-inputted update reservation time from the user. For this, the communicator 300 may display a menu for maintaining or changing the update reservation time on a display screen, and may receive information on maintenance or change of the update reservation time from the user. Also, the communicator 300 may transmit the set update reservation time to the target end node 401.

Then, the target end node 401 may determine whether the vehicle is turned off (S160). As described above, when the software update of the target end node 401 is performed during the running of the vehicle, the target end node 401 may not normally operate. To prevent this, the target end node 401 may determine whether or not the vehicle is turned off.

If it is determined in the step S160 that the vehicle is not turned off, the target end node 401 may return to the step S160 to determine again whether the vehicle is not running.

On the other hand, if it is determined in the step S160 that the vehicle is turned off, the target end node 401 may switch its PHY layer from a normal state to a sleep state.

The target end node 401 may determine whether the current time is the update reservation time (S170).

If it is determined in the step S170 that the current time is not the update reservation time, the target end node 401 may return to the step before the step S170 to determine again whether the current time is the update reservation time.

On the other hand, if it is determined in the step S170 that the current time is the update reservation time, the target end node 401 may switch its PHY layer from the sleep state to a ready state. The target end node 401 may wake up the ECU at the set update reservation time (S180).

Here, the target end node 401 may wake up at the update reservation time and supply power to the PHY layer of the target end node 401. The target end node 401 may transmit a request of link-up and a request of wake-up to the communicator 300.

At this time, the target end node 410 may control the PCS of the PHY layer not to transmit network requests to the communicator 300 or the end nodes 402 to 404 so that the other end nodes 402 to 404 are not woken up.

As another example, the target end node 401 may request the communicator 300 to prevent transmission of network requests so that the other end nodes 402 to 404 except the target end node 401 are not woken up. Upon receiving the request from the target end node 401, the communicator 300 may control the PCS of the PHY layer of the communicator 300 not to transmit network requests to the other end nodes 402 to 404.

As another example, the target end node 401 may request the other end nodes 402 to 404 not to transmit network requests so that the other end nodes 402 to 404 are not woken up. Through this, during updating of the software, the other end nodes 402 to 404 except the target end node 401 may be prevented from being woken up.

That is, power is supplied to the PHY layer of the target end node 401 at the update reservation time so as to wake up the ECU of the target end node 401, but the other end nodes 402 to 404 may not be woken up. That is, the communicator 300 may wake up only the target end node 401 that requires the update of the software, but may not wake up other end nodes except for the target end node 401 by maintaining the network in a sleep state (S190). Here, the PHY layer of the target end node 401 may maintain the ready state, and the other end nodes 402 to 404 may maintain sleep states.

Subsequently, the ECU of the target end node 401 may update its software with the software stored in the memory (S200). At this time, updating of the software at the target end node 401 may be performed in a state in which the vehicle is not running.

Then, the target end node 401 may perform rebooting after performing the software update (S210), and the target end node 401 may check whether the software update has been normally performed (S220).

Then, the target end node 401 may determine whether the update of the software has succeeded (S230). As a result of the determination in the step S230, the target end node 401 may recover the previous software when an error occurs in updating the software (S240). At this time, the software having the update error may be deleted and the previous software may be restored so that the target end node 401 can operate normally when the vehicle is turned on.

As a result of the determination in the step S230, if the software update is normally performed, the target end node 401 may complete the update (S250).

The target end node 401 may then transmit the update result to the communicator 300. At this time, the target end node 401 may transmit the update result of the software to the communicator 300 after the vehicle is turned on.

The PHY layer of the target end node 401 may maintain the ready state until the update of the software is completed. The target end node 401 may switch the PHY layer from the ready state to the sleep state after the update of the software is completed.

Thereafter, the communicator 300 may not download the same version of software from the software center 500 when the update of the software in the target end node 401 is successful, based on the update result received from the target end node 401. On the other hand, the communicator 300 may download the same version of the software again from the software center 500 when the update of the software in the target end node 401 fails. At this time, the communicator 300 may perform the software update of the target end node 401 again by performing the operations of S120 to S250 again.

Meanwhile, in the description of S180, it was described that the target end node 401 may request the communicator 300 to prevent transmissions of network requests. However, embodiments of the present disclosure are not limited thereto. As another example, after performing the update operation, the target end node 401 may perform a reboot in order to check whether the software update is normally performed. The target end node 401 may supply power to the PHY layer after rebooting, and may control the PCS of the PHY layer not to transmit network requests to the communicator 300 or the other end nodes 402 to 404. As another example, the target end node 401 may request the communicator 300 to prevent transmission of network requests so that the other end nodes are not woken up.

When updating the software of the target end node 401 using an on-board diagnostics (OBD) apparatus as well as the above-described reservation-based update method, the method described with reference to FIG. 5 may be applied. In this case, after the target end node 401 is woken up by connecting the OBD apparatus to the vehicle network in a state in which the vehicle is not turned on, the software of the target end node 401 may be updated through S190 to S250. Here, the target end node 401 may control the PCS of the PHY layer not to transmit network requests to the communicator 300 or the other end nodes 402 to 404 so that the other end nodes 402 to 404 are not woken up. As another example, the target end node 401 may request the communicator 300 to prevent transmission of network requests so that the other end nodes 402 to 404 are not woken up. Upon receiving the request, the communicator 300 may control the PCS of the PHY layer so that network requests are not transmitted to the other end nodes 402 to 404.

Using methods and apparatuses for updating software of a vehicle according to the embodiments of the present disclosure, only a target end node among a plurality of end nodes connected to an Ethernet-based vehicle network can be woken up for update of software so as to reduce power consumption of the vehicle due to the update of software. Also, abnormal operations due to the update of software can be prevented by allowing the update of software to be performed only while the vehicle is not running.

Also, a communicator may receive a software update result from a target end node, and a communicator may retry the update of software based on the software update result.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An operation method of a first communication node constituting an Ethernet-based vehicle network of a vehicle, comprising:

transitioning, by a physical (PHY) layer included in the first communication node, from a sleep state to a ready state at an update reservation time when software of the first communication node is updated;

controlling, by the PHY layer operating in the ready state, a physical coding sub-layer (PCS) to prevent transmitting network requests to other communication nodes connected to the Ethernet-based vehicle network; and performing, by a controller included in the first communication node, updating the software, wherein the updating is performed in case that software used for the updating is identified as stored in a memory of the first communication node, and wherein the PHY layer operates in the sleep state, the ready state, or a normal state, the PHY layer operating in the ready state or the normal state is woken up, and the PHY layer operating in the normal state transmits the network requests to the other communication nodes.

2. The operation method according to claim 1, wherein the update reservation time is received from a second communication node connected to the Ethernet-based vehicle network.

3. The operation method according to claim 2, wherein the updating is performed while the vehicle is turned off.

4. The operation method according to claim 3, wherein a result of the updating is transmitted to the second communication node after the vehicle is turned on.

5. The operation method according to claim 3, further comprising performing, by the controller, a reboot and checking the updating after the updating is completed.

6. The operation method according to claim 5, further comprising restoring, by the controller, previous software before the updating when the updating fails.

7. An operation method of a communicator constituting an Ethernet-based vehicle network of a vehicle, comprising:

transitioning, by a physical (PHY) layer included in the communicator, from a sleep state to a ready state at an update reservation time when software of the communicator is updated;

controlling, by the PHY layer operating in the ready state, a physical coding sub-layer (PCS) to prevent transmitting network requests to other communication nodes connected to the Ethernet-based vehicle network, and performing, by a controller included in the communicator, updating the software of the communicator using downloaded software, and wherein the PHY layer operates in the sleep state, the ready state, or a normal state, the PHY layer operating in the ready state or the normal state is woken up, and the PHY layer operating in the normal state transmits the network requests to the other communication nodes.

8. The operation method according to claim 7, further comprising downloading software from a software center.

9. The operation method according to claim 8, wherein the software is downloaded after the waking up at the update reservation time.

10. The operation method according to claim 8, wherein the software is downloaded while the vehicle is running.

11. The operation method according to claim 8, further comprising transmitting, by the PHY layer, the downloaded software to a specific communication node connected to the Ethernet-based vehicle network when the downloaded software corresponds to the specific communication node.

12. The operation method according to claim 11, further comprising receiving, by the PHY layer, a result of updating software of the specific communication node using the downloaded software from the specific communication node.

13. A communication node constituting an Ethernet-based vehicle network of a vehicle, comprising a physical (PHY) layer including a PHY layer processor, and a controller including a controller processor and a memory storing at least one instruction executed by at least one of the PHY layer processor and the controller processor, wherein the at least one instruction, when executed, is configured to cause:
the PHY layer to transition from a sleep state to a ready state at an update reservation time when software of the communication node is updated;
the PHY layer to control operating in the ready state, a physical coding sub-layer (PCS) to prevent transmitting network requests to other communication nodes connected to the vehicle network; and
the controller to perform updating the software of the communication node using received software at the update reservation time,
wherein the PHY layer operates in the sleep state, the ready state, or a normal state,
the PHY layer operating in the ready state or the normal state is woken up, and
the PHY layer operating in the normal state transmits the network requests to the other communication nodes.

14. The communication node according to claim 13, wherein the at least one instruction, when executed, is further configured to cause:
the PHY layer to receive software from a communicator in the vehicle while the vehicle is running;
the memory to store the received software; and
the PHY layer to receive an update reservation time of the received software from the communicator.

15. The communication node according to claim 14, wherein the at least one instruction, when executed, is further configured to cause the controller to update the software of the communication node after the vehicle is turned off.

16. The communication node according to claim 13, wherein the at least one instruction, when executed, is further configured to cause the controller to perform a reboot and check the updating after the updating is completed.

17. The communication node according to claim 15, wherein the at least one instruction, when executed, is further configured to cause the controller to restore previous software before the updating when the updating fails.

* * * * *